(No Model.)
C. F. CHRISTOPHER & R. B. ALEXANDER.
TETHER.
No. 274,462. Patented Mar. 27, 1883.
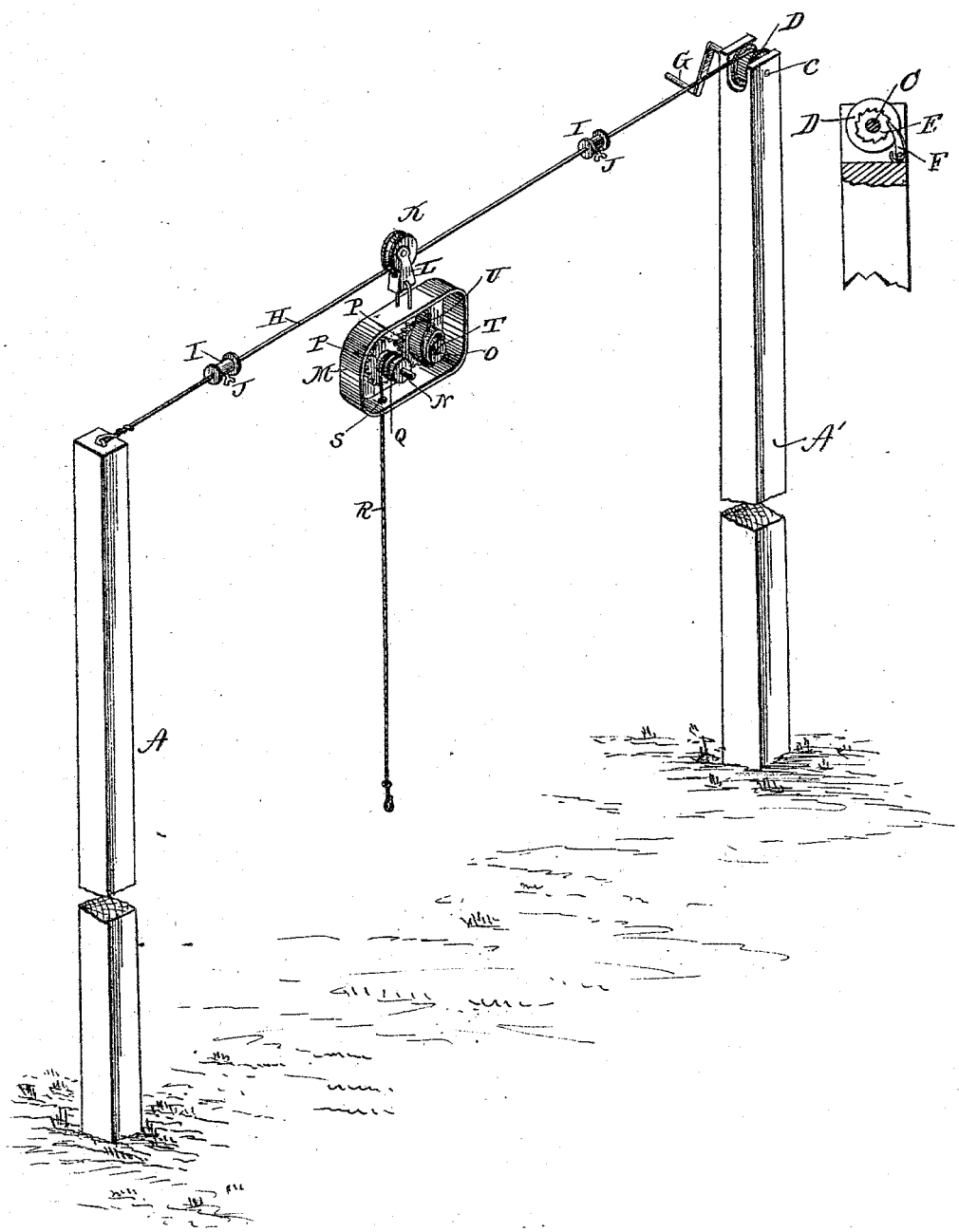
WITNESSES
INVENTORS
Attorneys.

UNITED STATES PATENT OFFICE.

CALVIN F. CHRISTOPHER AND ROBERT B. ALEXANDER, OF SPARTANBURG, SOUTH CAROLINA.

TETHER.

SPECIFICATION forming part of Letters Patent No. 274,462, dated March 27, 1883.

Application filed August 18, 1882. (No model.)

*To all whom it may concern:*

Be it known that we, CALVIN F. CHRISTOPHER and ROBERT B. ALEXANDER, of Spartanburg, in the county of Spartanburg and State of South Carolina, have invented certain new and useful Improvements in Tethers; and we do hereby declare that the following is a full, clear, and exact description of the invention, which will enable others skilled in the art to which it appertains to make and use the same, reference being had to the accompanying drawing, which forms a part of this specification.

This invention relates to tethers; and it consists in certain improvements in the construction of the same, which will be hereinafter fully described with reference to the drawing, which represents a perspective view of our invention, the side of the reel-casing having been removed in order to expose the working parts.

A A' represent two stakes or uprights, set in the ground a suitable distance apart. One of said posts, A', is forked at its upper end, as at B, to furnish bearings for a shaft, C, carrying a reel, D, and a small ratchet-wheel, E, engaging a spring-pawl, F, secured to one of the sides of the fork. Shaft C also has a crank, G, by which it may be turned.

H is a rope or wire, one end of which is attached to the upper end of post A, and the other end of which is attached to reel D. By turning shaft C the wire is then wound upon said reel until perfectly taut.

I I are sleeves adjustable upon the wire H by set-screws J, or in any other suitable manner.

Moving upon the wire H, between the sleeves I I, which prevent it from getting too near either post, is a pulley, K, having a hanger, L, to which is swiveled a box or casing, M, in the sides of which are journaled shafts N O parallel to each other, and provided with intermeshing pinions P P. Shaft N carries a reel, Q, upon which is wound a rope, R, extending through a slot or opening, S, in the bottom of the casing. Shaft O carries a drum, T, to which is attached one end of a spring, U, wound upon said drum, and having its other end attached to the wall of the casing.

The operation of our invention will be readily understood. When the cord or rope R, to the end of which an animal is tethered, is drawn out or unwound from drum or reel Q, the spring U is wound upon drum T, the shaft O being revolved by the action of the intermeshing pinions P. When the strain upon rope R is released the action of the spring causes the rope to be again wound upon the drum.

We claim and desire to secure by Letters Patent of the United States—

The combination of the posts A A', rope or wire H, pulley K, having hanger L, and the swiveled casing M, having shafts N O, intermeshing pinions P P, reel Q, drum T, spring U, attached to said drum and to the wall of the casing, and the rope R, wound upon reel Q and extending through a slot, S, as set forth.

In testimony that we claim the foregoing as our own we have hereto affixed our signatures in presence of two witnesses.

CALVIN FILLMORE CHRISTOPHER.
ROBERT BLACK ALEXANDER.

Witnesses:
F. M. TRIMMINE,
WASH. POOLE.